United States Patent
Park et al.

(10) Patent No.: US 8,199,811 B2
(45) Date of Patent: Jun. 12, 2012

(54) DIGITAL BROADCAST SYSTEM AND DATA PROCESSING METHOD

(75) Inventors: Sang Kil Park, Seoul (KR); In Hwan Choi, Gyeonggi-do (KR); Jae Hyung Song, Seoul (KR); Chul Soo Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 658 days.

(21) Appl. No.: 12/372,694

(22) Filed: Feb. 17, 2009

(65) Prior Publication Data

US 2009/0207908 A1   Aug. 20, 2009

Related U.S. Application Data

(60) Provisional application No. 61/029,550, filed on Feb. 18, 2008.

(30) Foreign Application Priority Data

Feb. 16, 2009 (KR) .......................... 10-2009-0012635

(51) Int. Cl.
 *H04N 11/02* (2006.01)
 *H04J 1/02* (2006.01)
(52) U.S. Cl. .................................. 375/240.01; 370/493

(58) Field of Classification Search .................. None
See application file for complete search history.

(56) References Cited

U.S. PATENT DOCUMENTS

| | | | |
|---|---|---|---|
| 6,584,120 B1 * | 6/2003 | Shiomoto et al. | 370/473 |
| 2006/0093315 A1 * | 5/2006 | Kelly et al. | 386/52 |
| 2007/0237187 A1 * | 10/2007 | Aoki | 370/535 |

* cited by examiner

*Primary Examiner* — Clemence Han
(74) *Attorney, Agent, or Firm* — Lee, Hong, Degerman, Kang & Waimey (57) ABSTRACT

A digital broadcast system and a data processing method are disclosed. A data processing method of a digital broadcast transmission system includes delaying a reference time of a program clock reference (PCR) based on a size of mobile service data, when processing a broadcasting signal including main service data and the mobile service data, verifying a transport stream system target decoder (T-STD) model based on the PCR of the delayed reference time, and storing a packet of the main service data in an auxiliary buffer, when overflow of a buffer in the T-STD model is estimated as the verification result of the T-STD model.

10 Claims, 8 Drawing Sheets

DIGITAL BROADCAST SYSTEM AND DATA PROCESSING METHOD

This application claims the benefit of 61/029,550, filed on Feb. 18, 2008, which is hereby incorporated by reference as if fully set forth herein. Also, this application claims the benefit of Korean Application No. 10-2009-0012635, filed on Feb. 16, 2009, which is hereby incorporated by reference.

BACKGROUND OF THE INVENTION

1. Field of the Invention

The present invention relates to a digital broadcast system, and more particularly, to a digital broadcast transmission system, a digital broadcast receiver, and a data processing method of the digital broadcast transmission system and the digital broadcast receiver.

2. Discussion of the Related Art

A digital broadcast system may include a digital broadcast transmitter and a digital broadcast receiver. The digital broadcast transmitter digitally processes data of a broadcasting program etc. and transmits the processed data to the digital broadcast receiver. Such a digital broadcast system is replacing an analog broadcast system, due to various advantages such as the efficiency of data transmission.

Recently, research into the digital broadcast receiver, which is capable of receiving broadcasting signals while moving, has been conducted. A digital broadcast transmission system can transmit both broadcasting signals for a fixed digital broadcast receiving system and broadcasting signals for a mobile digital broadcast receiving system.

However, according to the prior art, if the broadcasting signals for the mobile digital broadcast receiving system are simply added to the broadcasting signals for the fixed digital broadcast receiving system, an unexpected overflow or underflow problem in a buffer occurs frequently.

SUMMARY OF THE INVENTION

Accordingly, the present invention is directed to a digital broadcast system and a data processing method that substantially obviate one or more problems due to limitations and disadvantages of the related art.

An object of the present invention is to provide a digital broadcast system and a data processing method which do not generate an overflow or underflow problem even when both broadcasting signals for a fixed digital broadcast receiving system and broadcasting signals for a mobile digital broadcast receiving system are processed.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a data processing method of a digital broadcast transmission system includes delaying a reference time of a program clock reference (PCR) based on a size of mobile service data, when processing a broadcasting signal including main service data and the mobile service data, verifying a transport stream system target decoder (T-STD) model based on the PCR of the delayed reference time, and storing a packet of the main service data in an auxiliary buffer, when overflow of a buffer in the T-STD model is estimated as the verification result of the T-STD model.

In another aspect of the present invention, a data processing method of a digital broadcast receiver includes receiving a broadcasting signal including a main service data packet, a mobile service data packet, and a program clock reference (PCR), reference time of which is delayed, wherein the broadcasting signal includes a null data packet instead of the main service data packet, according to a result of a verification process of the T-STD model of a digital broadcast transmission system, demultiplexing the received broadcasting signal, and decoding the main service data packet, which is demultiplexed, according to the PCR.

In a further aspect of the present invention, a digital broadcast transmission system includes a delay for delaying a reference time of a program clock reference (PCR) based on a size of mobile service data, when processing a broadcasting signal including main service data and the mobile service data, a verifier for verifying a transport stream system target decoder (T-STD) model based on the PCR of the delayed reference time, and an auxiliary buffer for storing a packet of the main service data according to a verification result of the T-STD model.

In another aspect of the present invention, a digital broadcast receiver includes a receiver for receiving a broadcasting signal including a main service data packet, a mobile service data packet, and a program clock reference (PCR), reference time of which is delayed, wherein the broadcasting signal includes a null data packet instead of the main service data packet, according to a result of a verification process of the T-STD model of a digital broadcast transmission system, a demultiplexer for demultiplexing the received broadcasting signal, and a decoder for decoding the main service data packet, which is demultiplexed, according to the PCR.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the exemplary embodiments of the present invention, examples of which are illustrated in the accompanying drawings. The exemplary embodiments of the invention may be modified in various forms and the invention should not be limited to the specific embodiments described herein.

Although the terms used in the present invention are selected from generally known and used terms while considering functions of the present invention, they may vary according to intention or customs of those skilled in the art or to emergence of new technology. Some of the terms mentioned in the description of the present invention may have been selected by the applicant at his or her discretion, and in such cases the detailed meanings thereof will be described in relevant parts of the description herein. Thus, the terms used in this specification should be interpreted based on the substantial meanings of the terms and the whole content of this specification rather than their simple names or meanings.

Among the terms used in the description of the present invention, main service data corresponds to data that can be received by a fixed receiving system and may include audio/video (A/V) data. More specifically, the main service data may include high definition (HD) or standard definition (SD) A/V data and may also include diverse data types required for data broadcasting. Moreover, known data refers to data that is pre-known by an agreement between a receiving side and a transmitting side Among the terms used in the description of the present invention, MH indicates respective first letters of the words "mobile" and "handheld" and is an opposite concept to a fixed type. MH service data may include at least one of mobile service data and handheld service data, and will be referred to as mobile service data for convenience of description. Herein, the mobile service data may include not only the MH service data but also any type of service data indicating mobile or portable characteristics. Therefore, the mobile service data according to the present invention is not limited only to the MH service data.

The above-described mobile service data may correspond to data having information, such as program execution files, stock information, etc., and may also correspond to A/V data. Particularly, the mobile service data may correspond to A/V data having lower resolution and lower data rate as compared to the main service data, as the service data for portable or mobile terminals (or a broadcast receiver). For example, if an A/V codec that is used for a conventional main service is an MPEG-2 codec, an MPEG-4 advanced video coding (AVC) or scalable video coding (SVC) having better image compression efficiency may be used as the A/V codec for the mobile service. Furthermore, any type of data may be transmitted as the mobile service data. For example, transport protocol expert group (TPEG) data for broadcasting real-time transportation information may be transmitted as the mobile service data.

A data service using the mobile service data may include weather forecast services, traffic information services, stock information services, viewer participation quiz programs, real-time polls, interactive education broadcast programs, gaming services, services providing information on synopsis, character, background music, and filming sites of soap operas, services providing information on past match scores and player profiles, and sports achievements, and services providing information programs classified by service, medium, time, and theme for product information and product order. Herein, the present invention is not limited only to the services mentioned above.

A transmitting system of the present invention provides backward compatibility in the main service data so as to be received by a conventional receiving system. The main service data and the mobile service data can be multiplexed on the same physical channel and then be transmitted.

Figure 1:
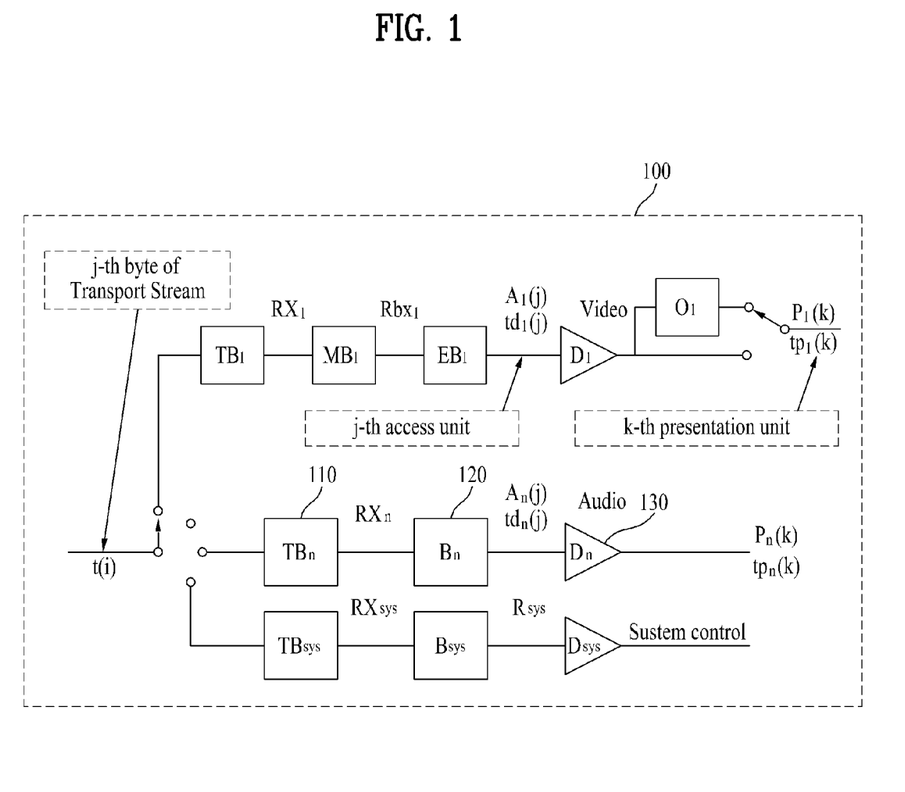
FIG. 1 is a block diagram illustrating the construction of a T-STD which is one type of digital broadcast transmission system.

FIG. 1 is a block diagram illustrating the construction of a transport stream system target decoder (T-STD) which is one type of digital broadcast transmission system. The T-STD may correspond to a moving picture experts group 2 (MPEG2) T-STD. The T-STD performs models of a digital broadcast receiver and adjusts an encoder of the digital broadcast receiver using the modeling result. In FIG. 1, t(i) denotes an input time of an i-th byte of a transport stream (TS), and a bit rate received at that time is about 19.39 Mbps for example.

Traveling paths of input TS packets are determined according to packet identifiers (PIDs). Video packets pass through the uppermost path (e.g., TB1 in FIG. 1), audio packets pass through a middle path (e.g., TBn in FIG. 1), and system control packets pass through the lowermost path (e.g., TBsys in FIG. 1).

In the specification of the present invention, a description will be given centering on the audio packets but the present invention may be applied to the video packets or the system control packets. Accordingly, the scope of the present invention should not be limited to the audio packets of the embodiment, but defined by the accompanying claims and equivalents thereof.

In FIG. 1, a TBn 110 denotes a transport buffer, a Bn 120 denotes a main buffer, and a Dn 130 denotes a decoder.

The TBn 110 may have a size of 512 bytes. Data input to the TBn 110 is transmitted to the Bn 120 at a rate of RXn. The traveling rate to the Bn 120 is 2 Mbps when the TBn 110 includes data and is 0 Mbps when the TBn 110 does not include data. Overflow should not occur in the TBn 110. However, when both mobile service data and main service data are processed, an overflow problem in the TBn 110 is considered. A method for solving this problem will be described in detail with reference to other drawings.

The size of the Bn 120 may be 3,584 bytes or 2,592 bytes. A bit stream, that is input at a rate of RXn, is transmitted to the Dn 130 at a time tdn(j). In this case, tdn(j) is determined by a decoding time stamp (DTS) transmitted through the bit stream. A system time clock (STC) is recovered using a program clock reference (PCR). At a time point when the recovered STC coincides with a DTS, data in the Bn 120 is transmitted to the Dn 130. Overflow and underflow should not occur in the Bn 120. However, when both the mobile service data and the main service data are processed, especially an overflow problem in the Bn 120 arises. A method for solving this problem will be described in detail with reference to other drawings.

Figure 2:
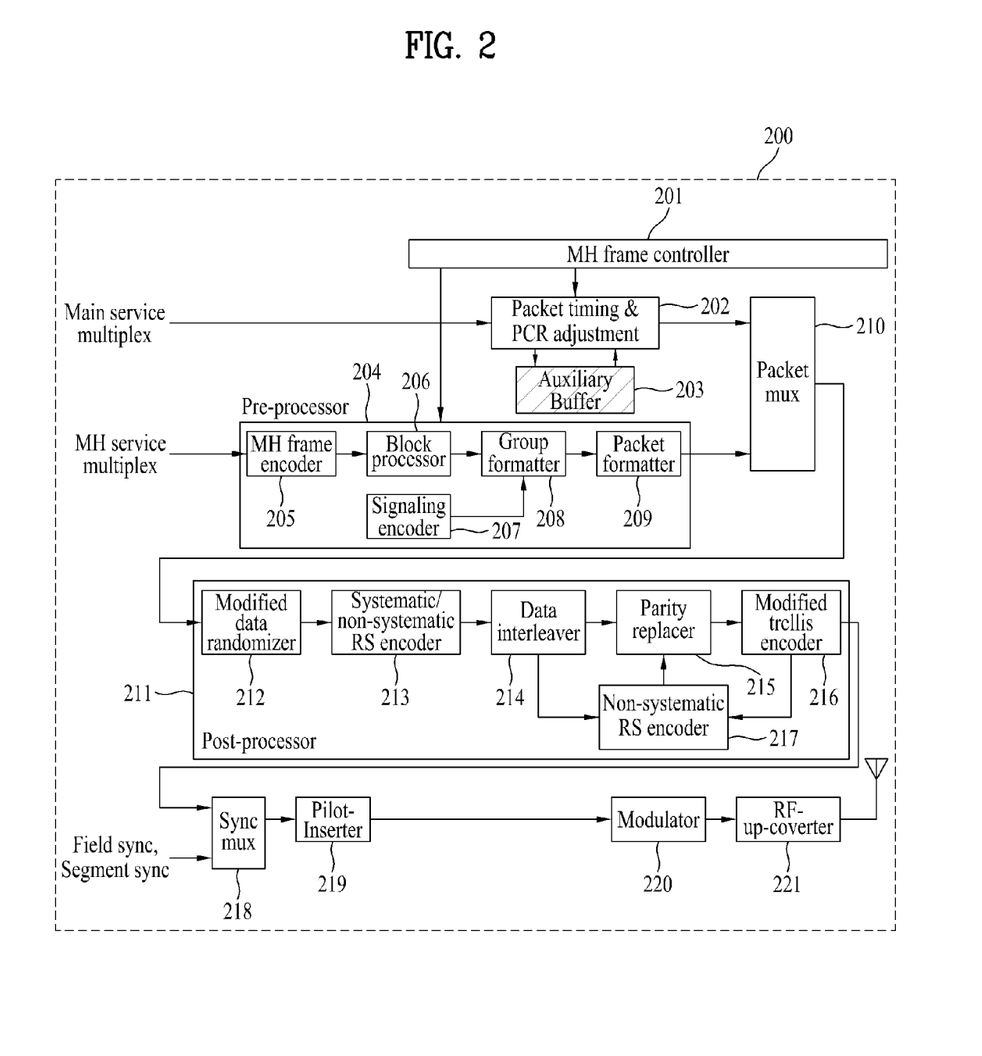
FIG. 2 is a block diagram illustrating the construction of a digital broadcast transmission system according to an exemplary embodiment of the present invention.

FIG. 2 is a block diagram illustrating the construction of a digital broadcast transmission system according to an exemplary embodiment of the present invention. As illustrated in FIG. 2, a digital broadcast transmission system 200 includes an MH frame controller 201, a packet timing/PCR adjustment unit 202, a packet multiplexer (MUX) 210, an MH frame encoder 205, a block processor 206, a signaling encoder 207, a group formatter 208, a packet formatter 209, a modified data randomizer 212, a systematic/non-systematic RS encoder 213, a data interleaver 214, a parity replacer 215, a non-systematic RS encoder 217, a modified trellis encoder 216, a synchronization (Sync) MUX 218, a pilot inserter 219, a modulator 220, a radio frequency (RF) up-converter 221, and an auxiliary buffer 203.

A module including the MH frame encoder 205, the block processor 206, the signaling encoder 207, the group formatter 208, and the packet formatter 209 may be refereed to as a pre-processor 204.

A module including the modified data randomizer 212, the systematic/non-systematic RS encoder 213, the data interleaver 214, the parity replacer 215, the non-systematic RS encoder 217, and the modified trellis encoder 216 may be referred to as a post-processor 211.

The packet MUX 210 multiplexes a main service data packet with a mobile service data packet that is output from the packet formatter 209 in units of 188 bytes, according to a predefined multiplexing scheme and outputs the multiplexed packet to the modified data randomizer 212. The multiplexing scheme can be adjusted by various parameters of a system design.

Meanwhile, the MH frame encoder 205 performs at least one of an error correction encoding process and an error detection encoding process when mobile service data is input thereto. Then robustness is provided to the mobile service data and burst errors that may occur during changes in a propagation environment are scattered, so that the mobile service data can cope with the propagation environment that is extremely poor and varies rapidly. The MH frame encoder 205 may include a process for mixing mobile service data of a constant size in units of a row.

The error correction encoding process applies RS encoding and the error detection encoding process applies cyclic redundancy check (CRC) encoding, as an exemplary embodiment. When performing the RS encoding, parity data to be used for error correction is generated, and when performing the CRC encoding, CRC data to be used for error detection is generated.

The RS encoding may use a forward error correction (FEC) structure. FEC refer to a technique for correcting errors generated in a transmission process. The CRC data generated by the CRC encoding may be used to indicate whether the mobile service data is damaged by errors while being transmitted through a channel. The present invention may use error detection encoding methods other than the CRC encoding or may raise overall error correction capabilities of a receiving side using the error correction encoding method.

The mobile service data that is encoded by the MH frame encoder 205 is input to the block processor 206. The block processor 206 encodes the input mobile service data at a code rate of G/H (where G<H) and outputs the encoded data to the group formatter 208. Here, the signaling encoder 207 may encode signaling data, independent of the MH frame encoder 205, and may transmit the encoded signaling data to the group formatter 208.

Namely, the block processor 206 divides the mobile service data input in byte units into data of bit units, encodes G-bit data into H-bit data, and converts the encoded data of bit units into data of byte units. For example, if 1-bit input data is encoded into 2-bit data, then G=1 and H=2, and if 1-bit input data is encoded into 4-bit data, then G=1 and H=4. For convenience of description, the former case will be referred to as encoding at a code rate of ½ (or ½-rate encoding) and the latter case will be referred to as encoding at a code rate of ¼ (or ¼-rate encoding).

Using ¼-rate encoding accomplishes higher error correction capabilities than using ½-rate encoding because of a higher code rate. For such a reason, assuming that data encoded at a code rate of ¼ in the group formatter 208, which is located near an end part of the system, is allocated to a region where reception performance may be degraded and data encoded at a code rate of ½ is allocated to a region having better performance, an effect of reducing the difference in performance can be obtained.

The block processor 206 may receive from the signaling encoder 207 additional information data, such as signaling containing system information etc. The ½ encoding or ¼-rate encoding is performed upon the additional information data in the same way as the mobile service data processing process. Thereafter, the additional information data such as signaling is regarded as the mobile service data and then is processed. The signaling information is necessary to receive and process data contained in a data group in a receiver and may include data group information, multiplexing information, etc.

Meanwhile, the group formatter 208 inserts the mobile service data generated from the block processor 206 into corresponding regions within a data group formed according to a predefined rule, inserts various place holders or known data related to data deinterleaving into corresponding regions within the data group, and performs deinterleaving.

The data group may be divided into at least one hierarchical region. The type of the mobile service data being inserted into each region may vary according to the characteristics of each hierarchical region. Each region may be divided based upon, for example, the reception performance within the data group.

The reason why the data group is divided into a plurality of regions is to use the regions according to different purposes. More specifically, regions in which no interference or less interference from the main service data may be considered to have a robust reception performance as compared to regions having higher interference levels. In a system that inserts known data into the data group and transmits the data, when it is desired that consecutively long known data be periodically inserted into the mobile service data, the known data having a predetermined length may be periodically inserted in a region having no interference from the main service data. However, in a region having interference from the main service data, it is difficult to periodically insert known data and to insert consecutively long known data into such a region.

Further, the group formatter 208 inserts into the data group additional information data, such as signaling, indicating overall transmission information, independent of the mobile service data.

In addition to the encoded mobile service data generated from the block processor 206, the group formatter 208 also inserts an MPEG header place holder, a non-systematic RS parity place holder, and a main service data place holder, which are related to data deinterleaving in a later process. The main service data place holder is inserted because the mobile service data and the main service data are alternately mixed with each other in regions based upon data after the data deinterleaving process is performed. For example, based upon the data output after data deinterleaving, the MPEG header place holder may be allocated at the very beginning of each packet.

The group formatter 208 inserts known data generated in accordance with a predetermined method or inserts a known data place holder for inserting the known data in a later process. Moreover, a place holder for initializing the modified trellis encoder 216 is also inserted in a corresponding region. For example, the initialization data place holder may be inserted in the beginning of the known data sequence.

The size of the mobile service data that can be inserted into one data group may vary according to the sizes of the trellis initialization or known data, MPEG header, and RS parity place holders.

The output of the group formatter 208 is transmitted to the packet formatter 209. The packet formatter 209 removes the main service data place holder and the RS parity place holder that have been allocated for the deinterleaving process from the deinterleaved input data. Then, the packet formatter 209 collects the remaining portion and inserts an MPEG header in a 4-byte MPEG header place holder.

When the group formatter 208 inserts the known data place holder, the packet formatter 209 may insert actual known data in the known data place holder, or may directly output the known data place holder without modification in order to perform replacement insertion in a later process.

Thereafter, the packet formatter 209 identifies data within the packet-formatted data group as described above, as a mobile service data packet (i.e., MPEG TS packet) of a 188-byte unit, which is then provided to the packet MUX 210.

Meanwhile, if input data is a main service data packet, the modified data randomizer 212 randomizes the input data in the same way as a conventional randomizer. Namely, the modified data randomizer 212 discards a synchronization byte within the main service data packet and randomizes the remaining 187 bytes using a pseudo random byte generated therein. Thereafter, the modified data randomizer 212 outputs the randomized data to the systematic/non-systematic RS encoder 213.

However, if the input data is a mobile service data packet, the modified data randomizer 212 deletes a synchronization byte from the 4-byte MPEG header included in the mobile service data packet and performs randomization only upon the other 3 bytes. The modified data randomizer 212 does not perform randomizing upon the other mobile service data except for the MPEG header and outputs the mobile service data to the systematic/non-systematic RS encoder 213.

The systematic/non-systematic RS encoder 213 performs an RS encoding process upon the data being randomized by the modified data randomizer 212 or upon the data bypassing the modified data randomizer 212, so as to add a 20-byte RS parity. The processed data is output to the data interleaver 214. If the input data corresponds to the main service data packet, the systematic/non-systematic RS encoder 213 performs the same systematic RS encoding process as in a conventional advanced television systems committee (ATSC) vestigial sideband (VSB) system, thereby adding the 20-byte RS parity to the end of 187-byte data. If the input data corresponds to the mobile service data packet, the systematic/non-systematic RS encoder 213 performs a non-systematic RS encoding process. At this point, the 20-byte RS parity obtained from the non-systematic RS encoding process is inserted in a predetermined parity byte location within the mobile service data packet.

The data interleaver 214 corresponds to a convolutional interleaver of a byte unit.

The output of the data interleaver 214 is input to the parity replacer 215 and to the non-systematic RS encoder 217.

Meanwhile, in order to decide the output data of the modified trellis encoder 216, which is located after the parity replacer 215, as the known data predefined according to an agreement between a transmitting side and a receiving side, a process of initializing a memory within the modified trellis encoder 216 is primarily required. That is, the memory of the modified trellis encoder 216 should be initialized before the input known data sequence is trellis-encoded.

In this case, the beginning portion of the input known data sequence corresponds to the initialization data place holder inserted in the group formatter 208, rather than the actual known data. Therefore, a process of generating initialization data immediately before the input known data sequence is trellis-encoded and replacing the initialization data place holder of the corresponding memory with the generated initialization data is required.

A value of the trellis memory initialization data is decided and generated based upon a memory status of the modified trellis encoder 216. Further, due to the newly replaced initialization data, a process of newly calculating the RS parity and replacing the RS parity, which is output from the data interleaver 214, with the newly calculated RS parity is required.

Therefore, the non-systematic RS encoder 217 receives the mobile service data packet including the initialization data place holder, which is to be replaced with the actual initialization data, from the data interleaver 214 and also receives the initialization data from the modified trellis encoder 216.

The non-systematic RS encoder 217 replaces the initialization data place holder within the input mobile service data packet with the initialization data and eliminates the RS parity data that are added to the mobile service data packet. Thereafter, the non-systematic RS encoder 217 calculates a new RS parity and outputs the RS parity to the parity replacer 215. Accordingly, the parity replacer 215 selects the output of the data interleaver 214 as data within the mobile service data packet and selects the output of the non-systematic RS encoder 217 as the RS parity. The selected data is then output to the modified trellis encoder 216.

Meanwhile, if the main service data packet is input, or if the mobile service data packet, which does not include any initialization data place holders that are to be replaced, is input, the parity replacer 215 selects the data and RS parity that are output from the data interleaver 214. Then, the parity replacer 215 directly outputs the selected data to the modified trellis encoder 216 without any modification.

The modified trellis encoder 216 converts data of a byte unit into data of a symbol unit and performs a 12-way interleaving process so as to trellis-encode the received data. Thereafter, the modified trellis encoder 216 outputs the processed data to the synchronization MUX 218.

The synchronization MUX 218 inserts a field synchronization signal and a segment synchronization signal to the data output from the modified trellis encoder 216 and, then, outputs the processed data to the pilot inserter 219.

The pilot inserter 219 inserts a pilot to the data received from the synchronization MUX 218 and the modulator 220 VSB-modulates the data received from the pilot inserter 219. The modulated data is transmitted to each broadcast receiving system or a digital broadcast receiver though the RF up-converter 221.

To prevent an underflow or overflow phenomenon of a buffer due to a packet, the exemplary embodiment of the present invention may include, as illustrated in FIG. 2, the packet timing/PCR adjustment unit 202, the auxiliary buffer 203, and the MH frame controller 201.

It is assumed that the size of an MH frame is about 968 milliseconds (ms), and the MH frame may be divided into 5 subframes. Each subframe is divided into 16 slots, each of which contains 156 consecutive TS packets. Among the 156 TS packets, 118 TS packets are allocated as an MH data region. The MH data region may mean a region in which the MH service data is allocated. If much MH data is present, MH data can be allocated to more slots. The MH data may correspond to the mobile service data.

Meanwhile, if the mobile service data is transmitted by allocating the MH data region as described above, a main service data packet cannot be transmitted at that moment. Therefore, a transmission order of the main service data packet that has not been transmitted should be changed so that the main service data packet can be transmitted in a region except for the region where the mobile service data is transmitted. The packet timing/PCR adjustment unit 202 is designed to perform such a function.

The packet timing/PCR adjustment unit 202 serves to correct changed time information as the time location of the main service data packet including a PCR is changed. To prevent buffer overflow, the packet timing/PCR adjustment unit 202 changes the location of an audio packet. Further, to prevent buffer underflow that occurs according to the location change of the audio packet, the packet timing/PCR adjustment unit 202 delays the reference time of the PCR.

To check whether underflow occurs in the buffers shown in FIG. 1, the following assumption is made.

If the audio packet is sampled at 32 kHz and is encoded at 384 kbps, one frame becomes 48 ms and a data size corresponds to 13 TS packets. Assuming that a DTS is set such that the audio packet is transmitted as fast as possible and is decoded as soon as transmission is completed, the size of data contained in the TBn 110 is shown in FIG. 3.

Figure 3:
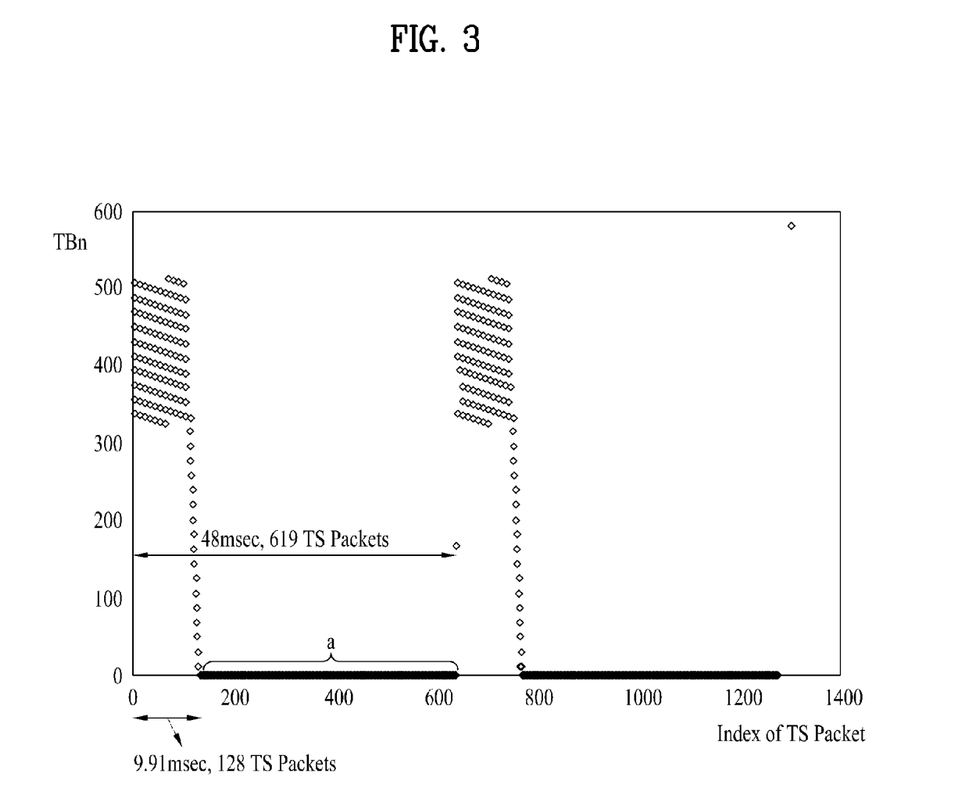
FIG. 3 is a diagram illustrating fullness of data stored in a transport buffer of the T-STD of FIG. 1, when only main service data is processed without mobile service data.

In FIG. 3, the horizontal axis corresponds to an index of a TS packet and the vertical axis indicates the size of data contained in the TBn 110. The period from when data is stacked in the TBn 110 to when the TBn 110 is empty corresponds to the period when one audio frame is shifted to Bn from TBn.

As shown in FIG. 3, if 9.91 ms elapses after the first audio TS packet is input, the TBn 110 is empty again. After this time point, the audio decoder such as the Dn 130 can decode the audio frame. That is, if a DTS value of an audio packetized elementary stream (PES) packet header contained in the first TS packet corresponds to an STC value after 9.91 ms elapses, underflow does not occur. Specifically, if a decoding process is performed in a region 'a' shown in FIG. 3, underflow does not occur.

Figure 4:
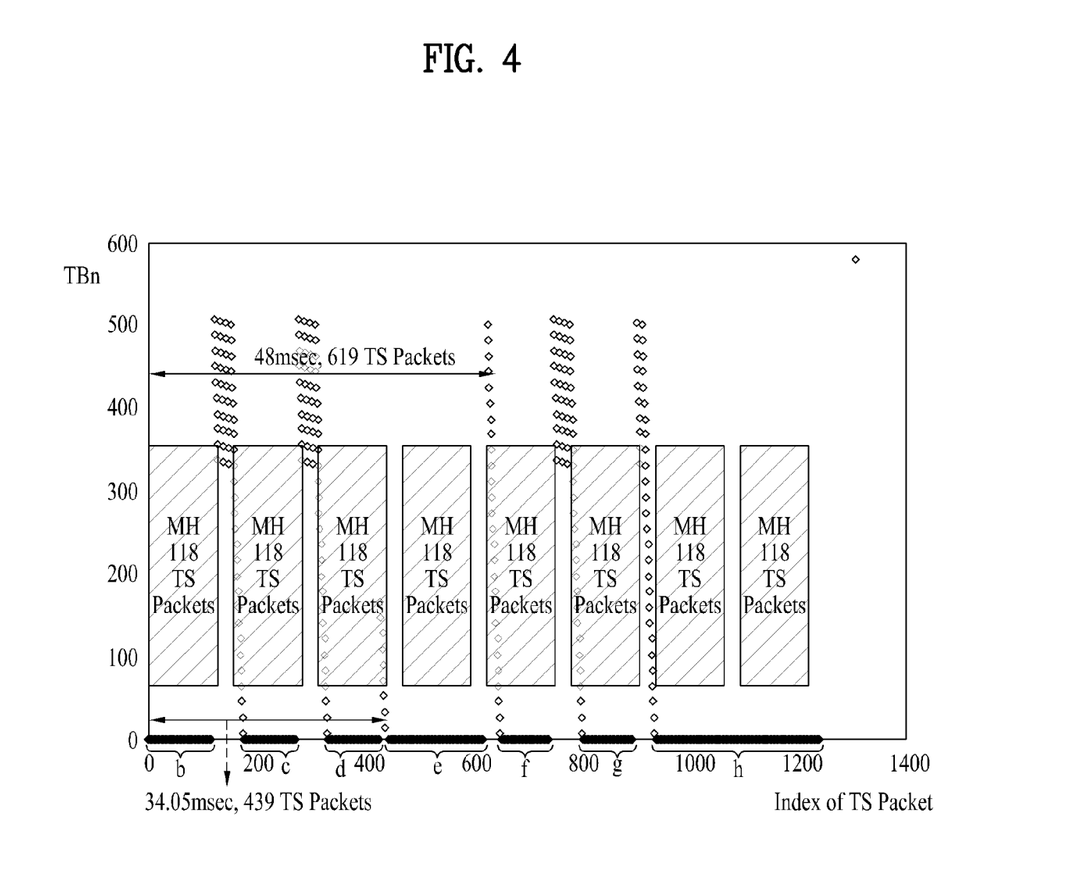
FIG. 4 is a diagram illustrating fullness of data stored in a transport buffer of the T-STD of FIG. 1, when both mobile service data and main service data are processed.

A phenomenon appearing when a main service data encoded stream is transmitted together with mobile service data will now be described. FIG. 4 shows the case where the mobile service data, that is, MH data is maximally transmitted. As described previously, the 118 TS packets are consecutively transmitted in the MH data. A main service data packet should be transmitted between intervals or slots in which the MH data is transmitted. Then the moment when TBn is empty becomes 34.05 ms, which is further delayed by 24.14 ms as compared to when the MH data is no longer present in FIG. 3.

Even though the MH data, etc. is transmitted, if a decoding process that does not consider the mobile service data is performed at any time point in the region 'a' shown in FIG. 3, especially at an early time point in the region 'a', without considering the MH data or mobile service data, a probability of generating underflow is high. This is because a data packet is shifted to the audio decoder from the audio buffer under the state that the Bn 120 is not completely filled with data.

Meanwhile, regions 'b', 'c', 'd', 'e', 'f', 'g', and 'h' may correspond to time zones when the main service data packet is not input.

The present invention is designed such that a PCR is adjusted in order to prevent such an underflow phenomenon. Namely, by comparing FIG. 3 with FIG. 4, which are obtained experimentally, the reference time of the PCR is delayed by more than 24.14 ms that is a time difference (34.05 ms−9.91 ms=24.14 ms) in FIG. 3 and FIG. 4. It is possible to sufficiently fill the main buffers by delaying a time at which the decoder operates. The time of 24.14 ms is a value obtained experimentally and the underflow phenomenon may be eliminated to some degree even if a time of 24 to 25 ms is applied.

According to another exemplary embodiment, not only the underflow phenomenon of the buffers, for example, the TBn 110 and the Bn 120 but also the overflow phenomenon thereof is substantially eliminated.

In the above description, the case where the audio packet is transmitted as fast as possible and is decoded as soon as transmission is completed has an underflow problem. Meanwhile, when the audio packet is designed such that the audio packet is transmitted rapidly but as much data as possible is stacked in the main buffer Bn 120, an overflow problem occurs.

Figure 5:
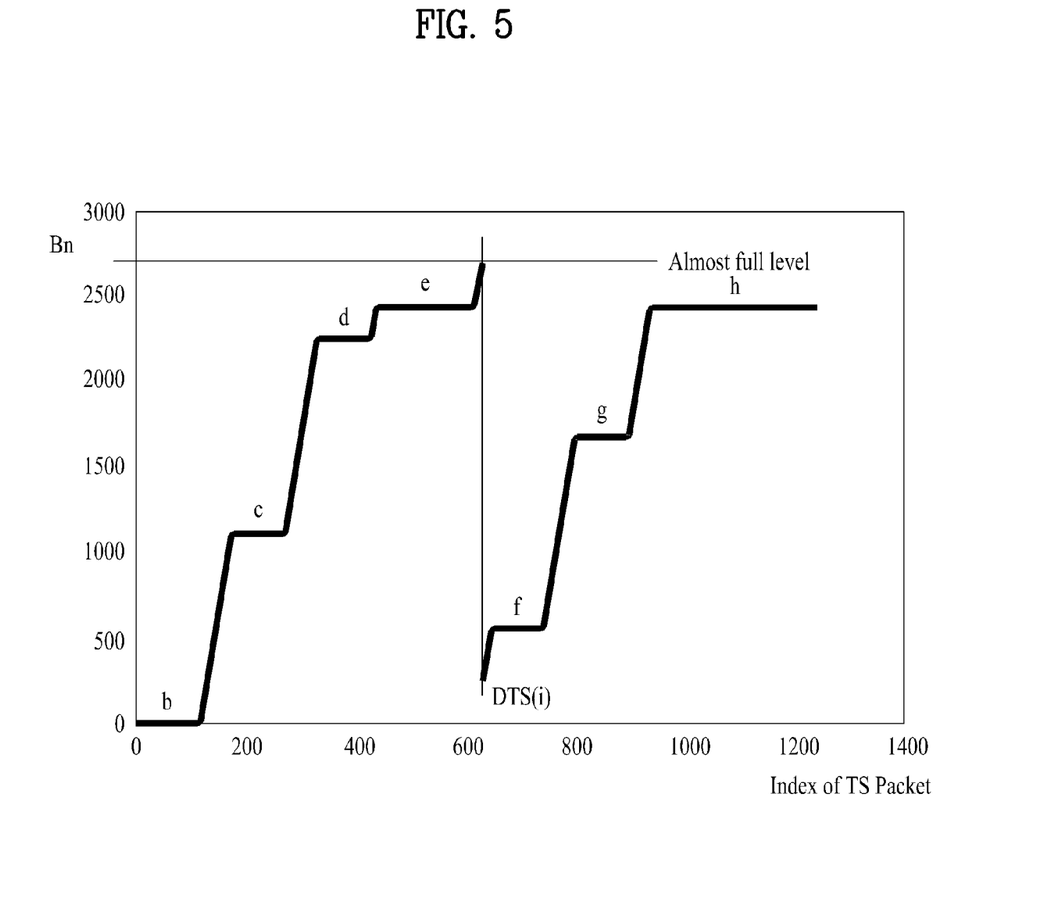
FIG. 5 is a diagram illustrating fullness of data stored in a main buffer of the T-STD of FIG. 1 before PCR adjustment, when both mobile service data and main service data are processed.

FIG. 5 shows a main buffer different from a transport buffer of FIG. 3 and FIG. 4. In FIG. 5, the horizontal axis corresponds to an index of a TS packet and the vertical axis indicates the size of data included in the Bn. FIG. 5 shows the case where as much data as possible is stacked in the main buffer and is then decoded. In this case, the mobile service data (or MH data) is also transmitted together with the main service data.

Figure 6:
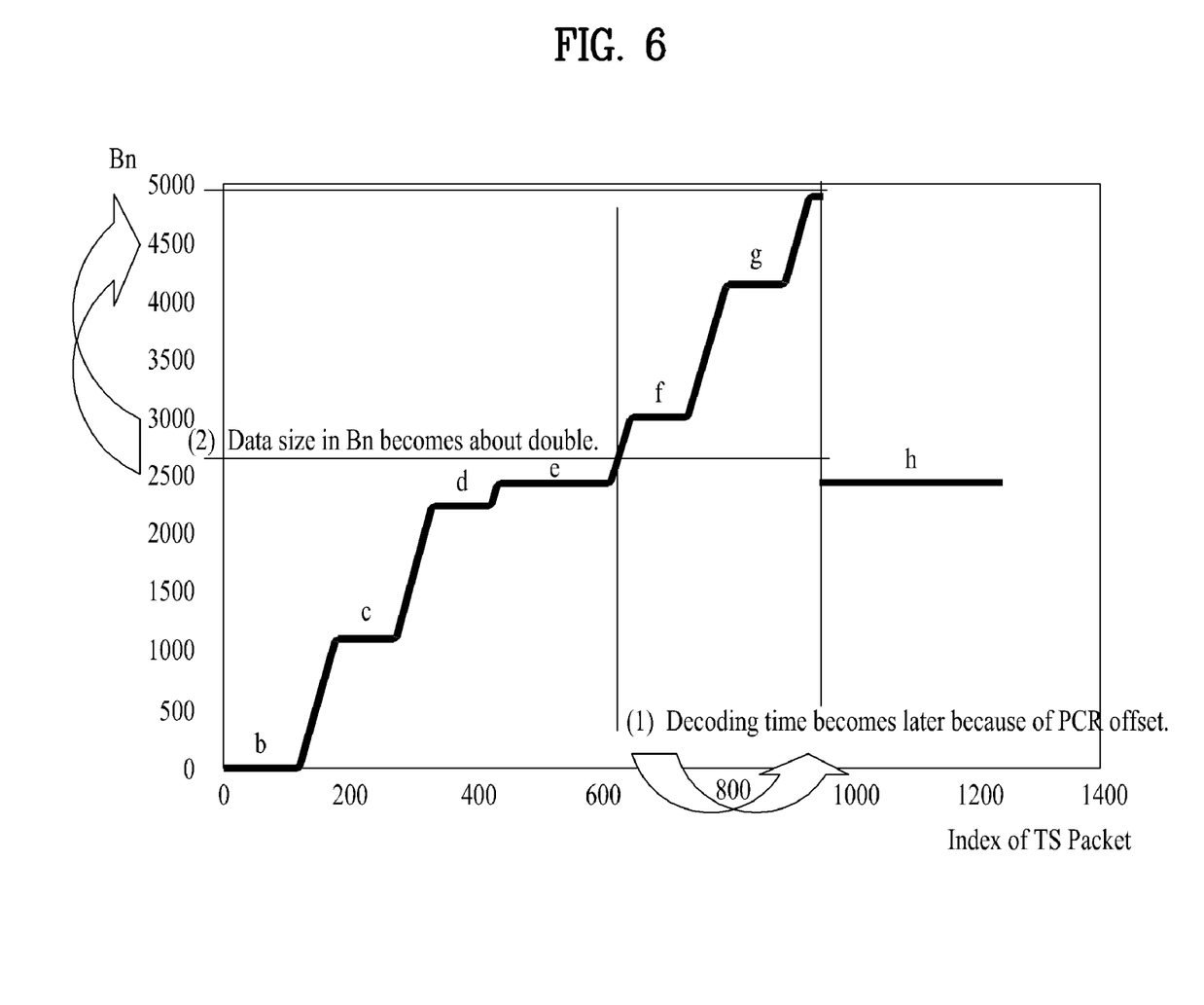
FIG. 6 is a diagram illustrating fullness of data stored in a transport buffer of the T-STD of FIG. 1 after PCR adjustment, when both mobile service data and main service data is processed.

As shown in FIG. 5, if audio packet data is transmitted, the audio packet data is stacked in the Bn 120. If the stacked audio packet data is transmitted to the audio decoder 130 at a time point of DTS(i), only a small amount of data remains in the Bn 120. If other frames are consecutively input again, the audio packet data is stacked in the Bn 120 again after the time point of DTS(i). However, if the reference time of a PCR is delayed to prevent underflow of the TBn 110 as described above, then a large amount of data is stacked in the Bn 120 as illustrated in FIG. 6. Namely, since the reference time of the PCR is delayed, actual decoding time is also delayed and a large amount of data is unexpectedly stacked in the Bn 120, thereby resulting in an overflow phenomenon of the Bn 120.

To remove the overflow phenomenon of the Bn 120, the MH frame controller 201, the packet timing/PCR adjustment unit 202, and the auxiliary buffer 203 are newly defined as illustrated in FIG. 2 according to the exemplary embodiment of the present invention.

If the digital broadcast transmission system 200 processes broadcasting signals including the main service data and the mobile service data, the packet timing/PCR adjustment unit 202 delays the reference time of the PCR based on the size of the mobile service data.

More specifically, the packet timing/PCR adjustment unit 202 delays the reference time of the PCR by a time of 24 to 25 ms, as a result of comparing the case where the broadcasting signals including the main service data are processed with the case where broadcasting signals including both the main service data and the mobile service data are processed. Therefore, when a TS packet satisfying a T-STD model 100 of FIG. 1 is transmitted through a process for enabling the packet timing/PCR adjustment unit 202 to delay the reference time of the PCR, the underflow phenomenon of the transport buffer 110 can be prevented. The T-STD model 100 of FIG. 1 may correspond to an MPEG2 T-STD.

The packet timing/PCR adjustment unit 202 or an additional module verifies the T-STD model 100 of FIG. 1, based on the PCR of the delayed reference time, before the broadcasting signals are transmitted. Further, the packet timing/PCR adjustment unit 202 determines whether overflow of the main buffer 120 of the T-STD model 100 is estimated, as a result of verifying the T-STD model 100.

The packet timing/PCR adjustment unit 202 or the additional model prevents the T-STD model 100 from overflowing in the main buffer 120, using the determination result. Such an operation is a process for preventing an overflow phenomenon which may appear in the Bn 120 shown in FIG. 1 as the reference time of the PCR is delayed.

The control process of the packet timing/PCR adjustment unit 202 or the additional module will now be described in detail.

If the overflow is estimated as the determination result, the packet timing/PCR adjustment unit 202 or the additional module stores a packet received in the main buffer 120 in the auxiliary buffer 203. The packet timing/PCR adjustment unit 202 or the additional module replaces the received packet with a null packet and performs a control function to transmit a broadcasting signal including the null packet.

The packet timing/PCR adjustment unit 202 or the additional module performs a control operation to store a replacing order in the above replacing process, and corrects an order of a packet to be transmitted to an original order using the stored replacing order, during transmission of the broadcasting signal.

If the overflow is not estimated as the determination result, the packet timing/PCR adjustment unit 202 or the additional module identifies whether the packet received in the main buffer 120 is a null packet. If the received packet is the null packet, the packet timing/PCR adjustment unit 202 or the additional module replaces the null packet with the packet which has been previously stored in the auxiliary buffer 203 and returns to the verification process.

Figure 7:
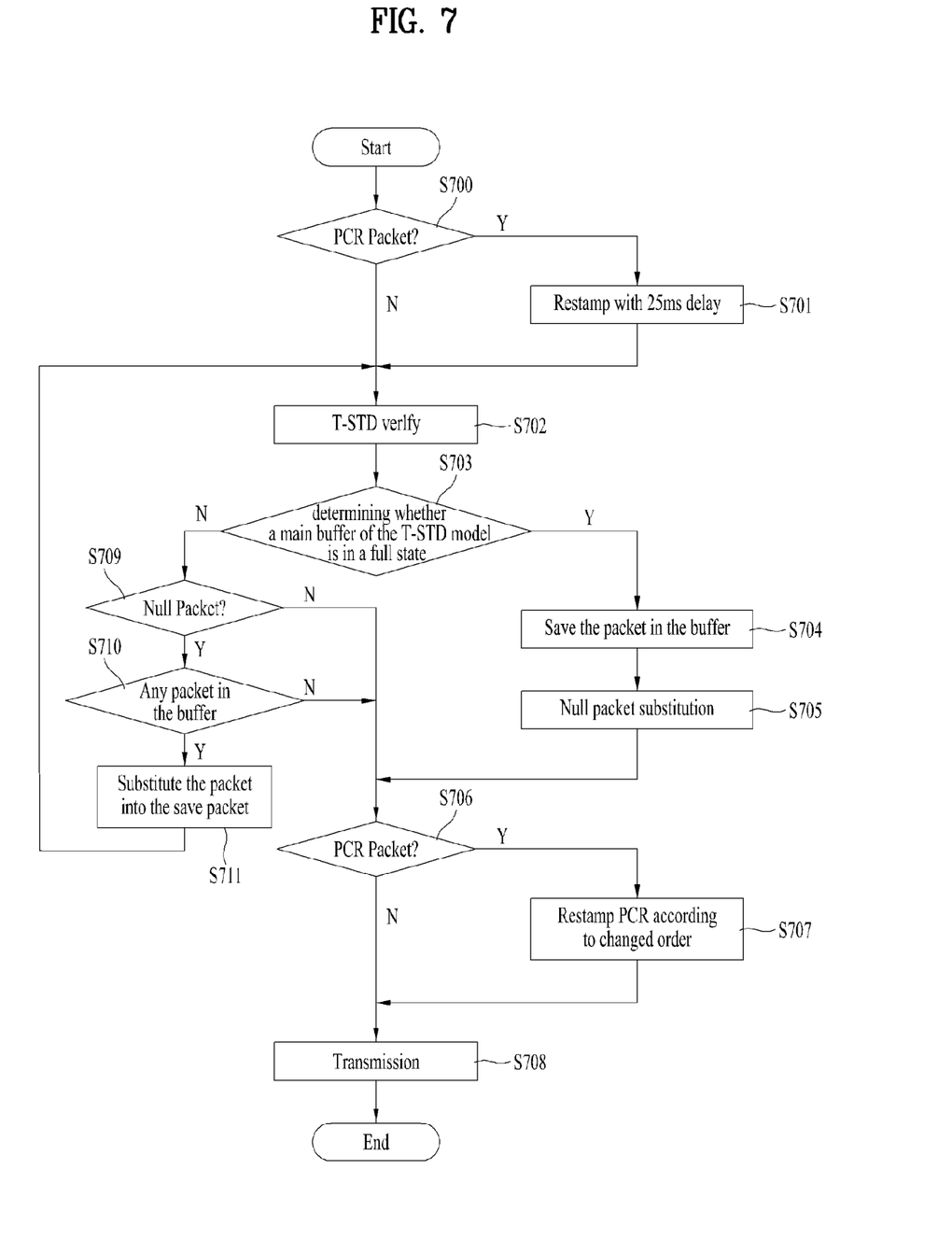
FIG. 7 is a flow chart illustrating a data processing method of a digital broadcast transmission system according to an exemplary embodiment of the present invention.

FIG. 7 is a flow chart illustrating a data processing method of a digital broadcast transmission system according to an exemplary embodiment of the present invention.

The digital broadcast transmission system determines whether a packet corresponds to a PCR packet including PCR information in step S700. If the packet corresponds to a PCR packet in step S700, the digital broadcast transmission system delays the reference signal of a PCR in step S701. The delay time may be determined in proportion to the size of mobile service data and may be a time delay in the range of 24 to 25 ms. More specifically, the time delay may be 24.14 ms.

The digital broadcast transmission system verifies the T-STD model based on the PCR of the delayed reference time in step S702, before transmitting a broadcasting signal. The digital broadcast transmission system determines whether a main buffer of the T-STD model is in a full state in step S703, as a result of verifying the T-STD model in step S702. The full state may mean that the main buffer is completely full or is almost full.

The digital broadcast transmission system prevents the T-STD model from overflowing the main buffer using the determination result. Such a control process may be implemented using the whole steps or partial steps of steps S704 to S711 shown in FIG. 7.

If the main buffer is full in step S703, the digital broadcast transmission system stores the packet received in the main buffer in the auxiliary buffer of the main buffer in step S704 and replaces the received packet with a null packet in step S705.

The digital broadcast transmission system determines whether a new packet corresponds to a PCR packet including PCR information in step S706. If the new packet does not correspond to a PCR packet, the digital broadcast transmission system transmits a broadcasting signal including the replaced null packet in step S708. However, if the new packet corresponds to the PCR packet in step S706, the digital broadcast transmission system restamps the PCR according to the changed order of the packet in step S707.

Another exemplary embodiment for implementing steps S707 and S708 may include a step of storing the packet replacing order in steps S704 and S705, and a step of correcting an order of a packet to be transmitted to an original order using the stored packet replacing order.

Meanwhile, if the main buffer of the T-STD model is not in a full state in step S703, the digital broadcast transmission system identifies whether the packet received in the main buffer is a null packet in step S709. If the received packet is a null packet, the digital broadcast transmission system determines whether another packet has been stored in the auxiliary buffer in step S710.

If another packet has been stored in step S710, the digital broadcast transmission system replaces the null packet with the packet stored in the auxiliary buffer in step S711 and returns to step S702.

Figure 8:
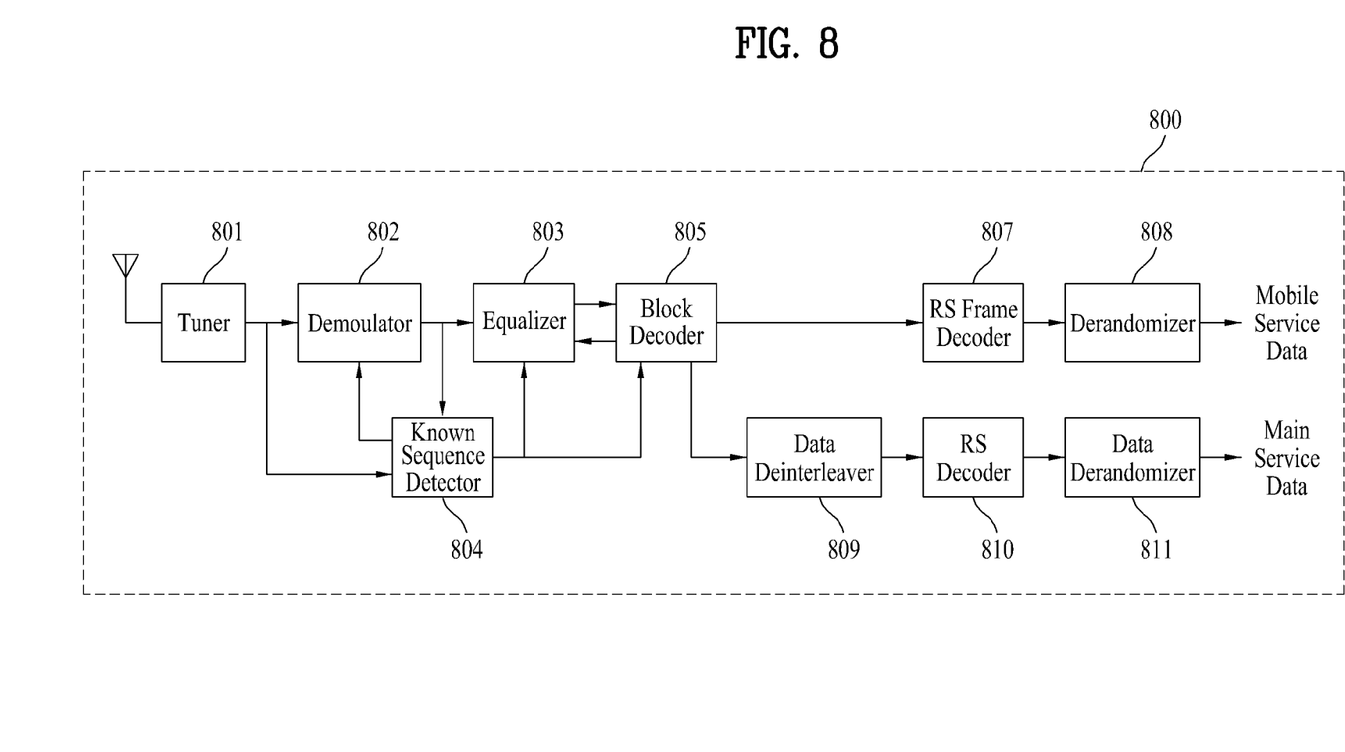
FIG. 8 is a block diagram illustrating a digital broadcast receiver according to an exemplary embodiment of the present invention.

FIG. 8 is a block diagram illustrating a digital broadcast receiver according to an exemplary embodiment of the present invention. The digital broadcast receiver of FIG. 8 can improve reception performance by performing carrier synchronization recovery, frame synchronization recovery, channel equalization, etc. using known data information, that is inserted into a mobile service data interval in a transmission system and then is transmitted.

A digital broadcast receiver 800 of the present invention includes a tuner 801, a demodulator 802, an equalizer 803, a known sequence detector 804, a block decoder 805, an RS frame decoder 807, a derandomizer 808, a data deinterleaver 809, an RS decoder 810, and a data derandomizer 811. For convenience of description, the RS frame decoder 807 and the derandomizer 808 will be referred to as a mobile service data processor, and the data deinterleaver 809, the RS decoder 810, and the data derandomizer 811 will be referred to as a main service data processor.

The tuner 801 tunes to a frequency of a specific channel and down-converts the tuned frequency to an intermediate frequency (IF) signal. Then, the tuner 801 outputs the down-converted IF signal to the demodulator 802 and to the known sequence detector 804.

The demodulator 802 performs automatic gain control, carrier recovery, and timing recovery processes upon the input IF signal, thereby converting the IF signal into a baseband signal. Thereafter, the demodulator 802 outputs the baseband signal to the equalizer 803 and to the known sequence detector 804.

The equalizer 803 compensates for the distortion of a channel included in the demodulated signal and then outputs the distortion-compensated signal to the block decoder 805.

The known sequence detector 804 detects a known data place inserted by the transmitting system from the input/output data of the demodulator 802, that is, the data before or after the demodulation process. Thereafter, the know sequence detector 804 outputs, along with the place information, a symbol sequence of the known data, which is generated from the detected place, to the demodulator 802 and to the equalizer 803. The known sequence detector 804 further outputs to the block decoder 805 information that is used to allow the block decoder 805 to identify mobile service data upon which additional encoding is performed in the transmission system and main service data upon which additional encoding is not performed. Although a connection status is not shown in FIG. 8, the information detected from the known sequence detector 804 may be used throughout the entire receiver and may also be used in the RS frame decoder 807.

The demodulator 802 uses the known data symbol sequence during the timing recovery or carrier recovery, thereby enhancing demodulation performance. Similarly, the equalizer 803 uses the known data so as to enhance the equalizing performance. Moreover, the decoding result of the block decoder 805 may be fed back to the equalizer 803, thereby enhancing the equalizing performance.

Meanwhile, if the data input to the block decoder 805 after being channel equalized from the equalizer 803 corresponds to data (e.g., data within an RS frame) upon which both block encoding and trellis encoding processes have been performed by the transmitting system, trellis decoding and block decoding processes are performed on the input data as inverse processes of the transmission system. Alternatively, if the data input to the block decoder 805 corresponds to data (e.g., main service data) upon which only the trellis encoding has been performed without block encoding, only the trellis decoding process is performed on the input data.

The data trellis-decoded and block-decoded by the block decoder 805 is input to the RS frame decoder 807. Namely, the block decoder 805 eliminates known data, data used for trellis initialization, signaling information data, and an MPEG header, which are inserted in a data group, and RS parity data, which is added by the systematic/non-systematic RS encoder or the non-systematic RS encoder of the transmission system. Thereafter, the block decoder 805 outputs the processed data to the RS frame decoder 807. The removal of the data may be performed before the block decoding process, or may be performed during or after the block decoding process.

Meanwhile, the data trellis-decoded by the block decoder 805 is output to the main service data processor. The data that is trellis-decoded by the block decoder 805 and output to the main data processor may include data and signaling information within the RS frame as well as the main service data. Moreover, the RS parity data that is added after the preprocessor of the transmission system may be included in the data that is output to the main service data processor.

As another exemplary embodiment, the data upon which only the trellis encoding has been performed and the block encoding has not been performed by the transmission system may bypass the block decoder 805 so as to be directly input to the main service data processor. In this case, a trellis decoder should be provided before the main service data processor. The main service data processor may be designed to be located at a position where a signal can be received from the block decoder 805 of FIG. 8.

If the input data corresponds to data upon which only the trellis encoding has been performed and the block encoding has not been performed in the transmission system, the block decoder 805 may perform Viterbi decoding on the input data so as to output a hard decision value or to perform a hard-decision on a soft decision value, and may output the result.

Meanwhile, if the input data corresponds to data upon which both the block encoding and the trellis encoding have been performed in the transmission system, the block decoder 805 outputs a soft decision value with respect to the input data.

More specifically, if the input data corresponds to data upon which the block encoding has been performed by the block processor of the transmission system and the trellis encoding has been performed by the trellis encoder of the transmission system, the block decoder 805 performs trellis decoding and the block decoding which are inverse processes of the transmission system. In this case, the block processor of the transmission system may be an external encoder and the trellis encoder may be an internal encoder.

To maximize the performance of an external code when decoding concatenated codes, the decoder of an internal code should output a soft decision value.

Therefore, the block decoder 805 may output a hard decision value on the mobile service data. However, when required, it may be more desirable for the block decoder 805 to output a soft decision value.

Meanwhile, the data deinterleaver 809, the RS decoder 810, and the derandomizer 811 are blocks required for receiving the main service data. Therefore, the above-mentioned blocks may not be required in the structure of a receiving system for receiving only the mobile service data.

The data deinterleaver 809 performs an inverse process of the data interleaver of the transmission system. In other words, the data deinterleaver 809 deinterleaves the main service data output from the block decoder 805 and outputs the deinterleaved main service data to the RS decoder 810.

The RS decoder 810 performs a systematic RS decoding process upon the deinterleaved data and outputs the processed data to the derandomizer 811.

The derandomizer 811 receives the output of the RS decoder 810 and generates a pseudo random data byte identical to that of the randomizer of the transmission system. Thereafter, the derandomizer 811 performs a bitwise exclusive OR (XOR) operation upon the generated pseudo random data byte, thereby inserting an MPEG synchronization byte into the beginning of each packet so as to output data in 188-byte main service data packet units.

The RS frame decoder 807 receives only the RS encoded and/or CRC encoded mobile service data from the block decoder 805.

The RS frame decoder 807 performs an inverse process of the RS frame encoder of the transmission system so as to correct errors within the RS frame. Then, the RS frame decoder 807 adds the 1-byte MPEG synchronization service data packet, which has been removed during the RS frame encoding process, into the error-corrected mobile service data packet. Thereafter, the RS frame decoder 807 outputs the processed data to the derandomizer 808.

The derandomizer 808 performs a derandomizing process corresponding to the inverse process of the randomizing process of the transmission system upon the received mobile service data. Therefore, the mobile service data transmitted from the transmission system can be obtained.

According to the exemplary embodiment of the present invention, the digital broadcast receiver can process the broadcasting signal including packets which do not generate underflow or overflow.

The tuner 801 receives a broadcasting signal including a main service data packet, a mobile service data packet, and a PCR of which reference time is delayed. A module in charge of the function of the tuner 801 may be referred to as a receiver.

According to the exemplary embodiment of the present invention, the tuner 801 receives a broadcasting signal including a null data packet instead of the main service data packet from the digital broadcast transmission system, according to the verification process result of the T-STD model.

The block decoder 805 demultiplexes the received broadcasting signal. A module in charge of the function of the block decoder 805 may be referred to as a demultiplexer.

The data interleaver 809, the RS decoder 810, and the data derandomizer 811 decode the demultiplexed main service data packet using the demultiplexing result, that is, according to the PCR. A module in charge of such a function may be referred to as a decoder.

Therefore, according to the exemplary embodiment of the present invention, adding the mobile service data to the existing main service data can solve all estimated underflow and overflow problems. For example, first, the underflow phenomenon in the buffer of the T-STD model can be substantially removed by delaying the reference time of the PCR to a prescribed range. Second, the overflow phenomenon in the main buffer of the T-STD model can be substantially removed by adding the auxiliary buffer and through a verification process for the T-STD model.

According to the exemplary embodiment of the present invention, the overflow and underflow problems of the T-STD model can be prevented by adding the MH data to the TS stream satisfying the T-STD.

According to the exemplary embodiment of the present invention, since the digital broadcast transmission system pre-checks the underflow and overflow, the underflow and overflow problems do not occur in the buffer of the digital broadcast receiver.

Meanwhile, in this specification, an article invention and a method invention have been described, and the article invention and the method invention include similar technical spirits. A description of the article invention may be applied to the method invention, and conversely, the method invention may be applied to the article invention.

The invention of the method according to the present invention may be implemented in the form of program commands that are capable of being performed through various computer means and then may be recorded in computer readable media. The computer readable media may include program commands, data files, data structures, etc. in an independent or combined form. Program commands recorded in the media may be designed and constructed particularly for the present invention or may be known to those skilled in the art. The computer readable media includes hardware devices that are configured to store and perform program commands. For example, the computer readable media includes magnetic media (e.g., hard discs, floppy discs, and magnetic tapes), optical media (e.g., CD-ROMs and DVDs), magneto-optical media (e.g., floptical disks), a ROM, a RAM, a flash memory, etc. The program commands include advanced language codes, that can be implemented by a computer using an interpreter, etc., as well as machine languages, that are configured by a compiler. The aforementioned hardware devices may be constructed to be operated as one or more software modules for carrying out the operation of the present invention, and an inverse process may be applied.

It will be apparent to those skilled in the art that various modifications and variations can be made in the present invention without departing from the spirit or scope of the inventions.

Thus, it is intended that the present invention covers the modifications and variations of this invention provided they come within the scope of the appended claims and their equivalents.

What is claimed is:

1. A data processing method of a digital broadcast transmission system, the method comprising:
    adjusting packet timing and a program clock reference (PCR) of main service data packets;
    processing a broadcasting signal including mobile service data, wherein the processing comprises:
    encoding the mobile service data for forward error correction (FEC);
    forming data groups having the encoded mobile service data;
    forming data packets having data in the data groups;
    multiplexing the data packets and the main service data packets; and
    transmitting a transmission frame having the multiplexed data.

2. The data processing method of claim 1, wherein processing the broadcasting signal further comprises block processing the encoded mobile service data by a specific code of either ½ or ¼.

3. The data processing method of claim 1, wherein at least one of the data groups includes a plurality of regions with known data sequences inserted into specific regions of the plurality of regions.

4. A data processing method of a digital broadcast receiver, the method comprising:
    receiving a broadcasting signal including main service data packets and mobile service data packets, wherein packet timing and a program clock reference (PCR) of the main service data packets are adjusted, wherein the mobile service data packets include data of data groups, wherein the data groups include mobile service data and signaling information for signaling the mobile service data, wherein at least one of the data groups includes a plurality of regions with known data sequences inserted into specific regions of the plurality of regions;
    demultiplexing the broadcasting signal;
    block processing the mobile service data by a specific code rate; and
    decoding the block processed mobile service data to build an RS (Reed-Solomon) frame.

5. The data processing method of claim 4, wherein the specific code rate is ½ or ¼.

6. A digital broadcast transmission system, comprising:
    an adjustment unit configured to adjust packet timing and a program clock reference (PCR) packets;
    a processor configured to process a broadcasting signal including mobile service data, wherein the processor comprises:
        an encoder configured to encode mobile service data for forward error correction (FEC),
        a group formatter configured to form data groups having the encoded mobile service data; and
        a packet formatter configured to form data packets having data in the data groups;
    a multiplexer configured to multiplex the data packets and the main service data packets; and
    a transmission unit configured to transmit a transmission frame having the multiplexed data.

7. The digital broadcast transmission system of claim 6, wherein the processor further comprises a block processor configured to block process the encoded mobile service data by a specific code rate of either ½ or ¼.

8. The digital broadcast transmission system of claim 7, wherein at least one of the data groups includes a plurality of regions with known data sequences inserted into specific regions of the plurality of regions.

9. A digital broadcast receiver, comprising:
    a receiver configured to receive a broadcasting signal including main service data packets and mobile service data packets, wherein packet timing and a program clock reference (PCR) of the main service data packets are adjusted, wherein the mobile service data packets include data of data groups, wherein the data groups include mobile service data and signaling information for signaling the mobile service data, wherein at least one of the data groups includes a plurality of regions with known data sequences inserted into specific regions of the plurality of regions;
    a demultiplexer configured to demultiplex the broadcasting signal;
    a block processor configured to block process the mobile service data by a specific code rate; and
    a decoder configured to decode the block processed mobile service data to build an RS (Reed-Solomon) frame.

10. The digital broadcast receiver of claim 9, wherein the specific code rate is ½ or ¼.

* * * * *